United States Patent

March et al.

[11] Patent Number: 6,132,601
[45] Date of Patent: Oct. 17, 2000

[54] ECOLOGICAL APPARATUS FOR PROCESSING SEWAGE

[76] Inventors: Frank Ernest March, deceased, late of Des Plaines, Ill.; by Dolores L. March, executrix, 208 Bradley, Des Plaines, Ill. 60068

[21] Appl. No.: 09/035,339

[22] Filed: Mar. 5, 1998

[51] Int. Cl.[7] .............................. C02F 3/00; C12M 1/10
[52] U.S. Cl. ................... 210/150; 210/220; 210/232; 261/2; 261/DIG. 71; 435/290.3; 248/74.1
[58] Field of Search ................................ 210/612, 613, 210/629, 620, 151, 177, 150, 205, 220, 232, 252, 255, 928, 178; 261/2, DIG. 70, DIG. 71; 248/74.1, 58; 435/290.3

[56] References Cited

U.S. PATENT DOCUMENTS

| | | |
|---|---|---|
| 3,255,887 | 6/1966 | Walker et al. . |
| 3,276,994 | 10/1966 | Andrews et al. . |
| 3,720,320 | 3/1973 | Fletcher . |
| 3,802,676 | 4/1974 | Thayer . |
| 3,837,810 | 9/1974 | Richards et al. . |
| 4,007,240 | 2/1977 | Gosden . |
| 4,012,470 | 3/1977 | Thayer . |
| 4,204,959 | 5/1980 | Kreuzburg et al. . |
| 4,268,398 | 5/1981 | Shuck et al. . |
| 4,663,046 | 5/1987 | Feldkirchner et al. . |
| 4,836,918 | 6/1989 | Szikriszt . |
| 5,328,601 | 7/1994 | Schmidt et al. . |
| 5,698,094 | 12/1997 | Abdellatif et al. . |
| 5,759,850 | 6/1998 | Seymour . |
| 5,779,890 | 7/1998 | Bailey . |

*Primary Examiner*—David A. Simmons
*Assistant Examiner*—Fred Prince
*Attorney, Agent, or Firm*—Frederick J. Otto; Jack Larsen; Adrienne Naumann

[57] ABSTRACT

An improved, multipass, horizontal rotating continuous feed digester provides an efficient aerobic digestion process for sewage, and which also reduces pollution. The improved digester promotes the ecology in that the gas and air feed and exhaust means are located at opposite ends of the digester. Moreover, the air and gas distribution means can be easily removed from the digester for inspection and cleaning.

22 Claims, 11 Drawing Sheets

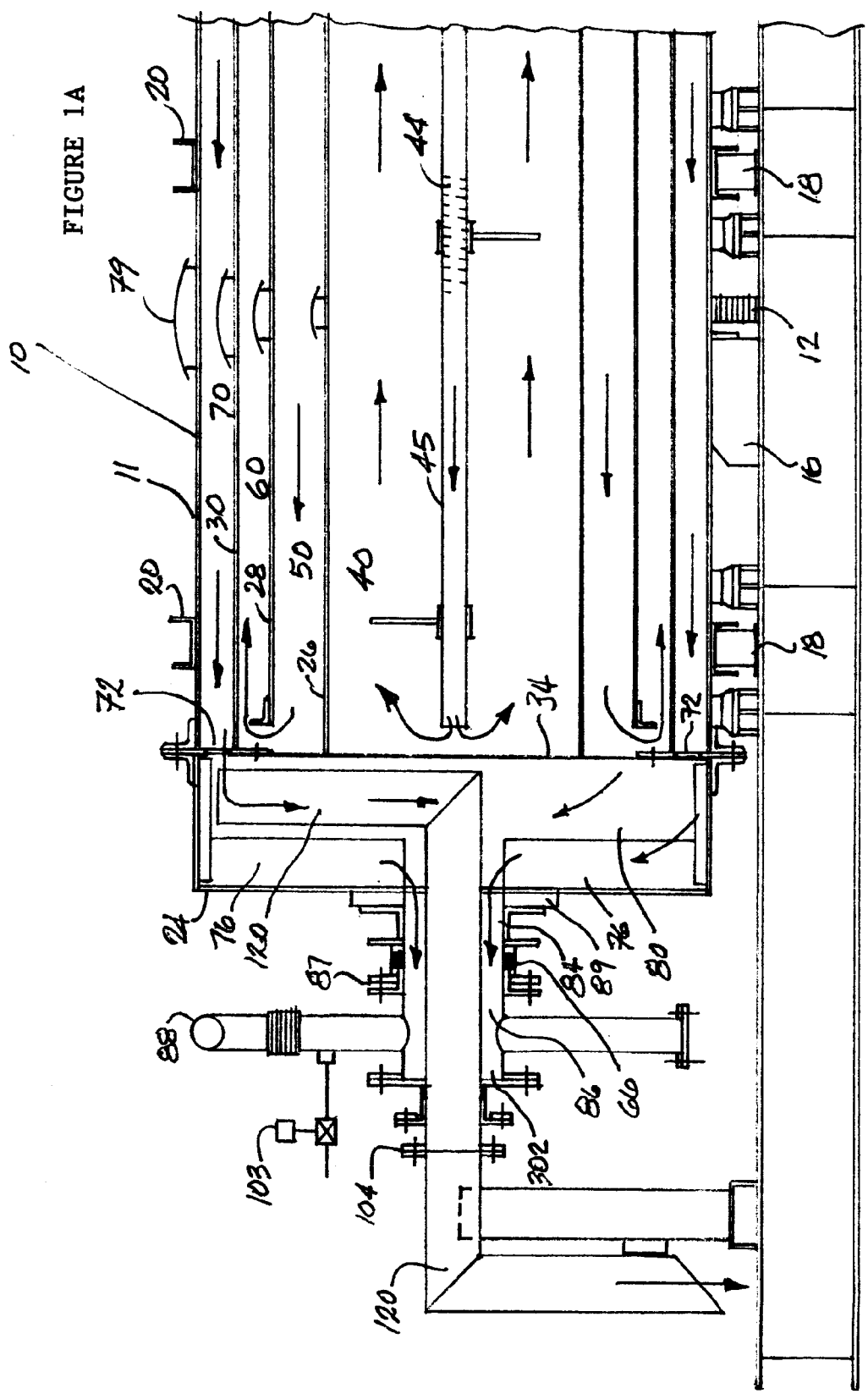

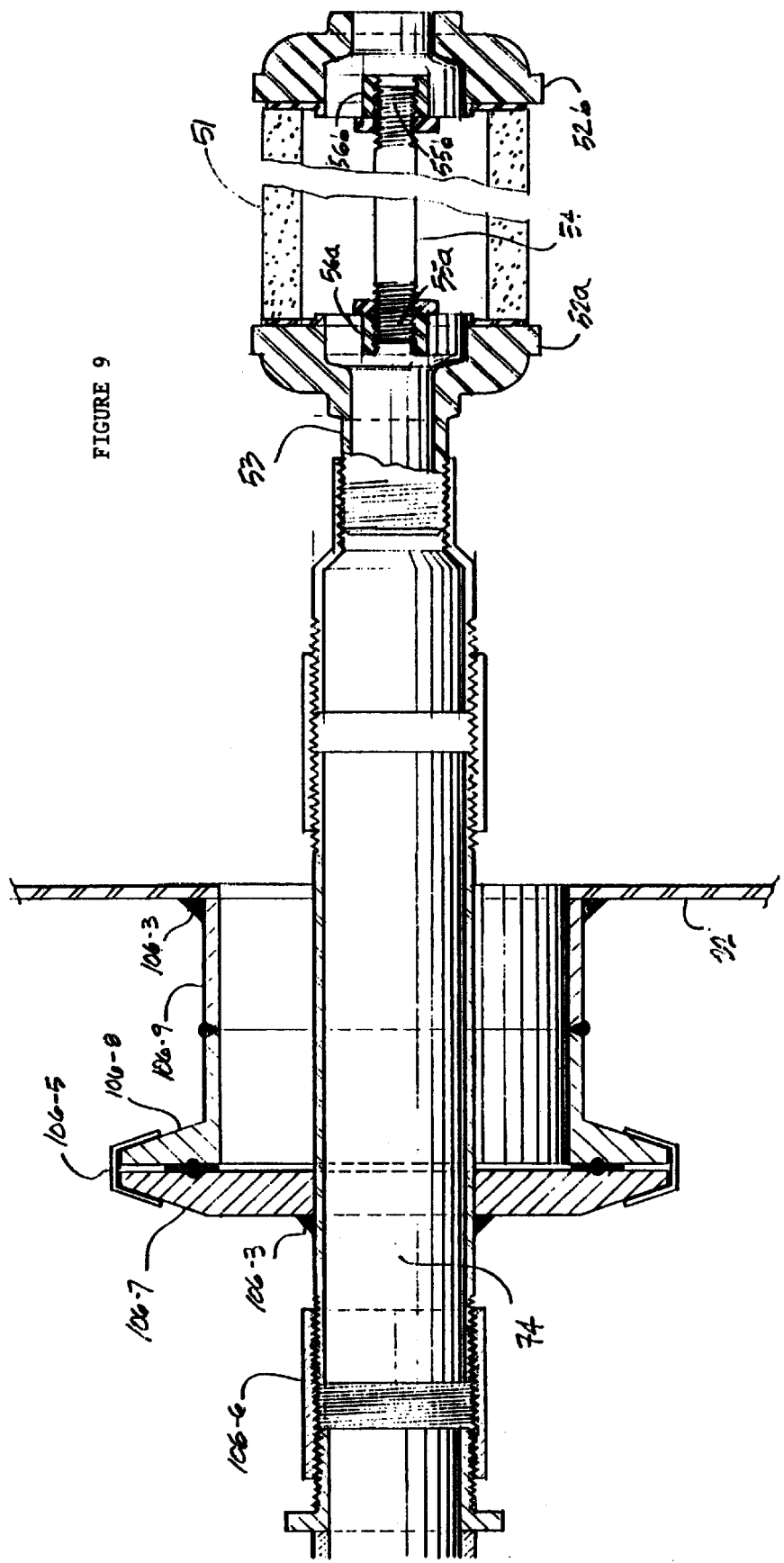

ECOLOGICAL APPARATUS FOR PROCESSING SEWAGE

BACKGROUND OF THE INVENTION

1. Field of the Invention

The present invention relates to an apparatus for processing sewage. More particularly, the present invention is a horizontally-rotating, multi-pass, continuous-feed digester which is suitable for treating sewage in general, but which is particularly useful in accomplishing aerobic digestion processes.

The digestion of sewage often has been carried out in large open tanks, wherein the process has been difficult to control. Large tanks are difficult to aerate uniformly, somewhat difficult to control temperatures, and it is also difficult to separate the input and the output. Consequently, the prior-art processes have generally not been efficient and require long holding times as a result of which the throughput is very low.

In most such sewage treatment plants, residues of heavy sludge, which comprise less than 0.2 percent of water-borne sewage, have been diverted to sedimentation tanks where relatively slow aerobic decomposition continues. The sludge was usually held in such digestion tanks for several weeks and was there finally digested into a dark, viscous fluid within which theoretically little or no further biological action could occur. The sludge was then removed from the tank and deposited on sludge-drying beds, dewatered in large heated drums, pulverized, sold as fertilizers, or incinerated. The heat generated in such processes kills any enteric pathogens.

2. Description of Related Art

Expired U.S. Pat. No. 3,720,320 (Fletcher) discloses a marked departure from the somewhat cumbersome, slow, digestion of sludge as described above. Fletcher describes a multi-pass device which supports an aerobic digestion process for decomposing sewage. The raw sewage was fed into this digester where it was aerated while rotating on a horizontal axis so that biological metabolism by the bacteria occurred in the sludge.

However, Fletcher has not achieved commercial success, possibly because first, air, and/or other gas, hereinafter "air/gas" enters at one end and then exits as exhaust gas at the same end of the digester. That may permit contamination of freshly oxygenated gas if a ring seal in a slip fitting should fail. Secondly, a like risk exists with the effluent in that raw sewage and effluent enter and discharge at the same end of the digester permitting contamination should a ring seal fail in the slip fitting, and thirdly, in applicant's improved digester the flow of sewage is modulated depending on the level or head of the feedstock.

A second serious problem with that model is that the air/gas distribution pipes, baffles, agitator blades and air/gas diffusers within the digester cannot be cleaned without shutting down the entire system.

A third problem to be overcome is met by the inclusion of a regulator valve which modulates the influx of sewage responsive to variable back pressure due to static head in the digester.

My improved invention resolves these problems by: (1) providing easily-removable means for aeration so that nozzles can be inspected and cleaned while digestion continues; (2) diverting sewage and air/gas so that they exit and enter at opposite ends of the digester; and (3) providing a regulator valve which is sensitive to and controls the total volume of sewage entering the digester; and (4) providing a valve that commutates the distribution of air/gas to a plurality of air headers to optimize the amount of air/gas delivered depending upon the static head variation as the digester rotates.

It will be seen that such a digester can process a biomass made up from wastes from food-processing, plant materials and animal waste. The input material will be referred to generically as "feedstock" or "raw sewage", the contents reacting therein as "biomass" and the material towards the end of the process as "effluent".

SUMMARY OF THE INVENTION

To solve these long-standing problems in the industry, my present invention, hereinafter referred to as a "digester", provides entry and exit of air/gas from opposite ends of the apparatus. It similarly has means for sewage and effluent to enter and exit at opposite ends of the digester. In addition, the digester has easily replaceable aerators for delivering air/gas in a controlled manner. In this way, the diffusers and other parts of the air-carrying pipes can be removed and cleaned to comply with environmental regulations.

Accordingly, a primary object of the present invention is to provide an improved air/gas distribution means to aerobically digest the sewage more efficiently.

Another object of the present invention is to provide improved air/gas piping and fittings which can be removed through an end plate of the digester without substantial leakage.

A further object of the invention is to provide means by which the raw sewage enters at one end of the improved digester and exits as effluent at the opposite end of the digester.

Yet another object of the invention is to provide a system of piping, fittings, valves and diffusers by which air/gas enters at one end of the improved digester and exits as exhaust gas at the opposite end of the digester. These and still other objects and advantages of my invention will become apparent from the following description of the preferred embodiment.

My invention resolves these problems by: (1) arranging the air/gas distribution pipes and diffusers inside the digester to be removable for cleaning without stopping the digester; (2) piping both sewage and air/gas so that both substances enter and exit the digester at opposite ends.

BRIEF DESCRIPTION OF THE DRAWINGS

My invention may be better understood by reference to the drawings accompanying this specification:

FIGS. 1A and 1B (together): provide a horizontal transverse side view of the entire digester showing the main and secondary horizontal cylinders as well as the air/gas and sewage entrance and exit means.

FIG. 9: Illustrates an improved aerator for use in the invention.

DESCRIPTION OF THE PREFERRED EMBODIMENT(S)

In my present invention the sewage is pretreated by screening and grinding prior to feeding into my improved digester. My present invention comprises of a horizontal, continuous-feed, multipass digester comprised of a main horizontal cylindrical shell enclosing secondary concentric cylinders, which all simultaneously rotate around the same horizontal axis. Manholes 79 for maintenance and repair and inspection pierce the cylinder as required. On each of the two opposing ends of the shell are end plates, which are also removable for maintenance and repair. One end plate is fitted to feed raw sewage and oxygenated air/gas into the digester. The opposite end plate has means to recover water, provide for the exit of exhaust gases, provide for exit of effluent and control the fluid level within the digester. Means are also provided whereby oxygen, air or other gases may be introduced under pressure continuously at selected points within the digester. These means are comprised in part of air/gas header distribution arms, which may themselves be porous or fitted with porous air diffusers, and which are installed along the full length of the digester. In the preferred embodiment, these header distribution pipes in turn are joined to external pipes preferably with Triclamp triclover flanged union coupling without a gasket or threads. The particular attachment/coupling means have been on sale from Ladish Company of Cudahy, Wis. Other alternatives for suitable connectors include: G&H heavy duty clamps, similar fittings, flanges, or unions. At their opposite ends these attachments are also connected to flexible hoses coupled to a second set of header pipes, which in turn, are directly connected to an air reservoir or plenum. Each air/gas header distribution pipe can be cleaned after removal from the digester through an opening. Each air/gas distribution pipe is supported by a fitting on an end plate of the digester.

The sewage, together with bacteria and air, moves radially outward from the mixer into the innermost channel. It then flows the length of a secondary cylinder member where it will again moves outwardly to the next adjacent channel. This flow system prevails from cylinder member to cylinder member. The entire digestion is thus carried out in a compact volume which can be carefully regulated as to temperature, flow rate, air/gas content and the like.

In the preferred embodiment of this invention, my digester accomplishes a highly efficient aerobic digestion of sewage wherein air/gas input can be carefully controlled. My invention is not limited to any size and can be built to any efficient and economical dimensions. There are on each header air distribution pipe, porous substances to provide environmental-code-required air/gas volume. In addition, each nozzle or diffuser is of a porous ceramic, metal or plastic material in the preferred embodiment. These porous materials release smaller bubbles than in previous inventions.

Figure 10B:
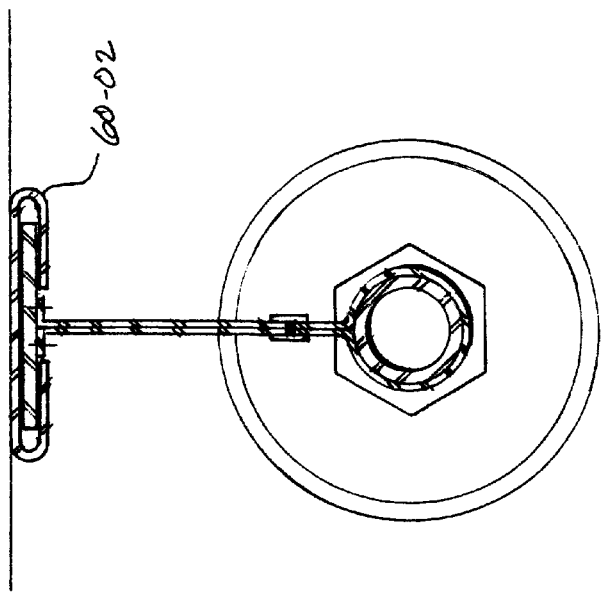
FIGS. 10A and 10B: Illustrate pipe hangers for supporting the air/gas distribution pipes on slotted rails.
Figure 10A:
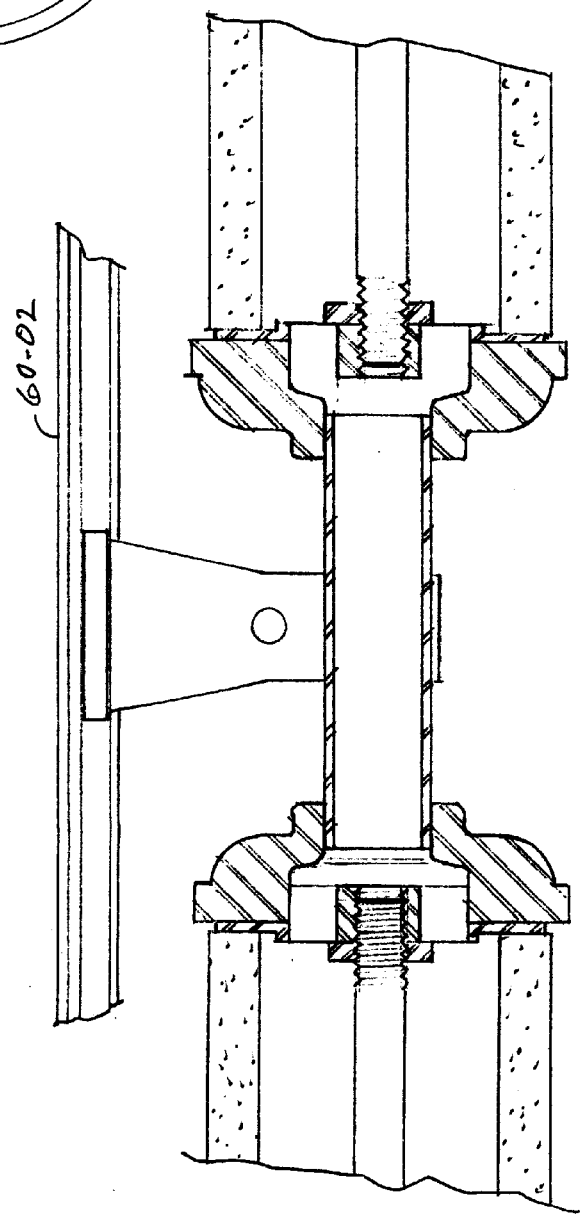

Pollution Control Inc. of Florence, Kentucky manufactures dome and tubular ceramic diffusers for applications requiring high gas to liquid transfer efficiency. They can be made of porous metal, stone, or plastic. The relatively small bubbles produced, coupled with an increase in contact time due to the slower rise rate of fine bubbles, accounts for their high gas transfer efficiency. An alternative embodiment to provide the requisite porosity is a header air/gas distribution pipe as shown in FIGS. 9 and 10A constructed of a string of sintered-alumina tubes, each 66.04 centimeters (twenty-six inches) in length, with an outer diameter of 6.35 centimeters (2.5 inches) and an inner diameter of 4.445 centimeters (1.75 inches), as provided in their model FBT-275 FINE BUBBLE DIFFUSER. Each standard tube 51 sits at one end on an air-header inlet casting 52a into which a 1.905 centimeter (0.75 inch) National Pipe Thread standard nipple 53 fits to connect the diffuser to a source of compressed air. Since sintered alumina has great strength under compression but is subject to cracking and failure in tension, the casting 52a is retained by a 0.9525 centimeter (0.375 inch) threaded rod 54 extending from a threaded socket 55a in the hub 56a of the casting 52a to an end cap and self-locking nut (not shown) in the case of a Model FBT-275 diffuser. But to adapt this standard diffuser to the present invention, the diffuser assembly is modified by substituting for the end cap, a second casting 52b to engage the threaded rod 54 in its socket 55b of the Model FBT-275. In the preferred embodiment of the present invention, the distal end (farthest from the source of air) of a string of diffusers is capped with a M.T.P. standard pipe cap. In FIG. 9, air pushing through each casting 52a and 52b is channeled around the hub 56a and 56b without significantly restricting the delivery of air/gas to the system. For one of our air-header inlet castings 52b, the socket 55b is threaded into the hub 56b of a second casting 52b and screwed onto the rod 54 at the other end of tube 51. The casting 52a is perforated to allow air to enter through the nipple 53 and continue through the porous ceramic tube 51. This pipe comprises segments of porous tubes and fittings which attach each to the next to make up any length, with the threaded fittings at each end, and hangers to support the pipe at an appropriate distance from the cylinder wall.

The significance of this portion of my invention is that the air-distribution pipes within the cylinder members can be easily removed for inspection and/or cleaning. The preferred embodiment uses the tubular air diffusers which mechanically attach to the air distribution pipes as will be seen infra. The pores are too small for water to enter and no eddies with high velocities develop near the pores.

Figure 1B:
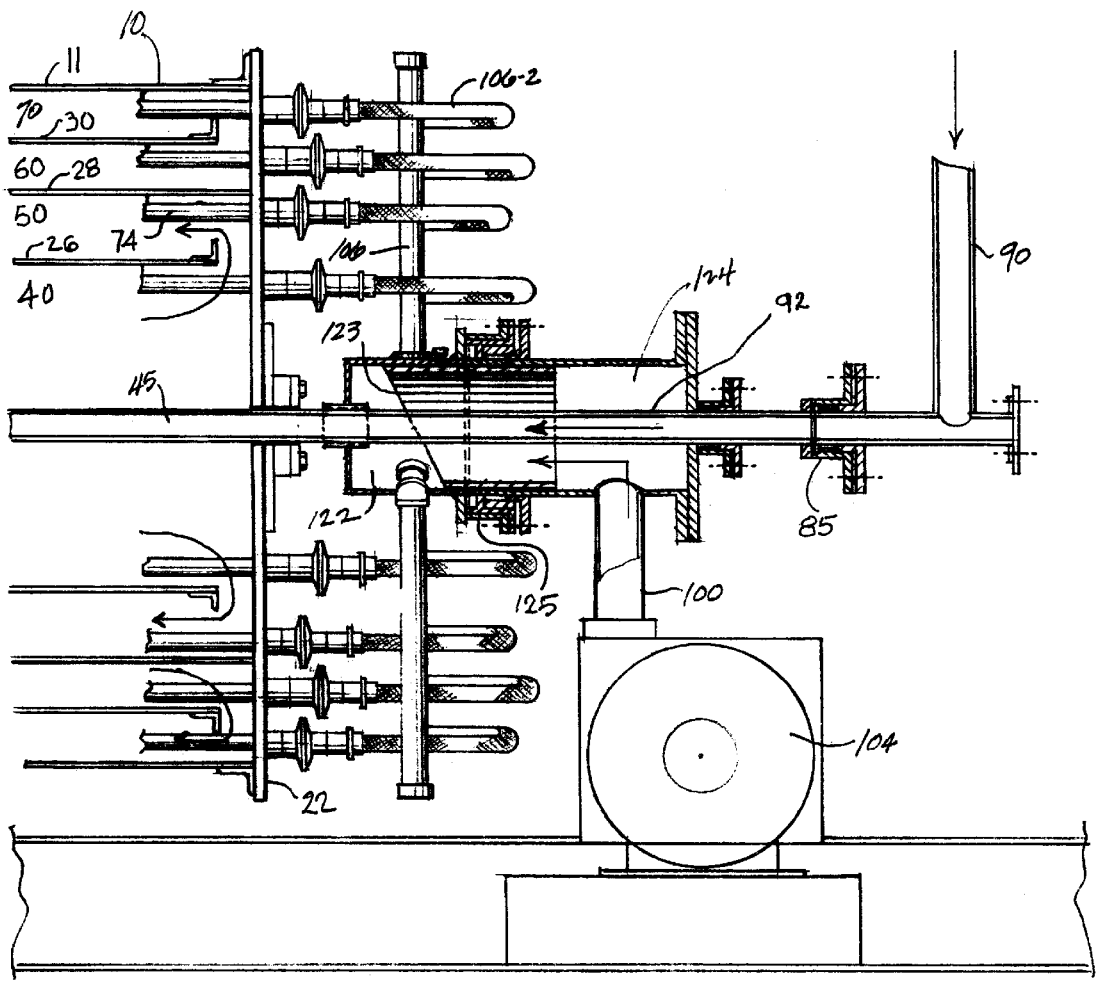
Figure 2:
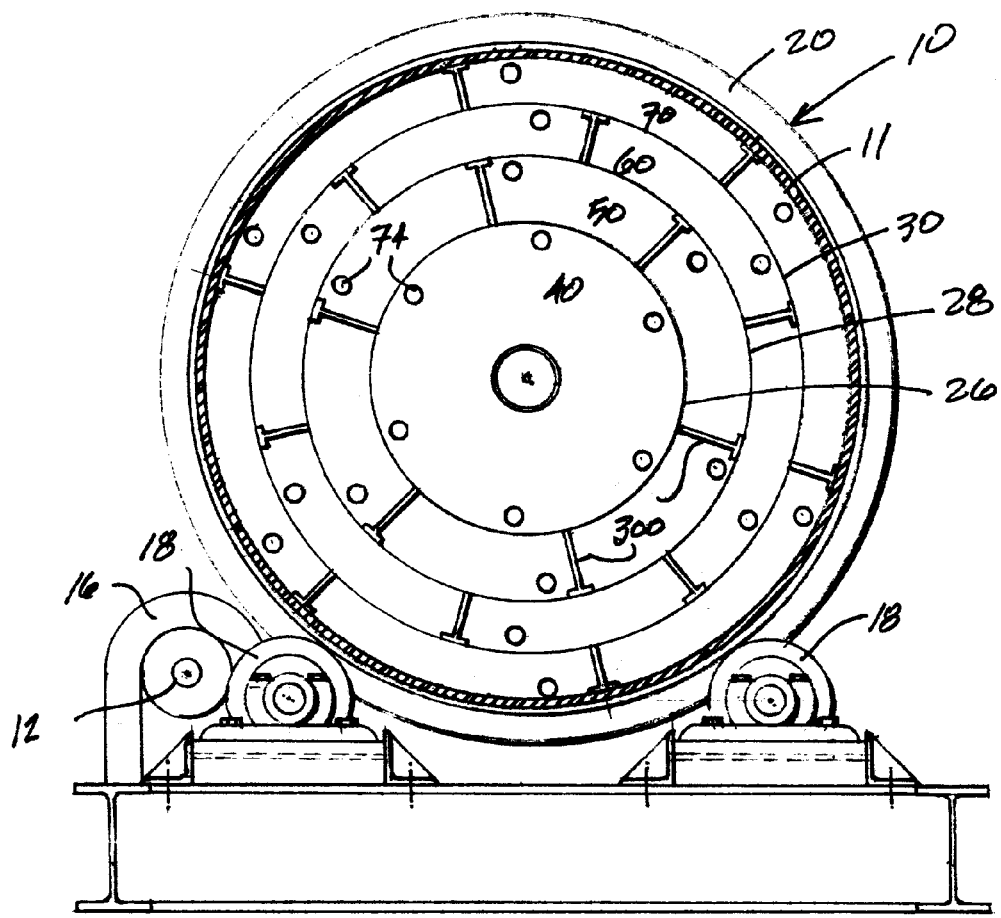
FIG. 2: Illustrates a cross-section through the main cylinders within the digester and reveals the relative positions of the struts and air/gas distribution pipes.

FIGS. 1A and 1B disclose the horizontal view of the complete machine. FIG. 2 is the end view of the machine. In FIG. 1A, digester 10 has support rings 20, a shell 11, and manholes 79, the number of which is determined by digester length. Digester 10 is rotated through a drive 16 on the left side as shown in FIG. 2. Support wheels 18 are positioned beneath support ring 20 and connected by a shaft with a gear 12, to provide digester 10 with rotational ability. The number of support wheels 18 and support rings 20 depends upon the length of digester 10.

In FIGS. 1A and 1B, end plates 22 and 34 provide fluid closure at horizontally opposed ends of shell 11. End plates 22 and 24 are removable to provide access for maintenance or adjustment. Disposed within the digester 10, as seen in both FIGS. 1A and 1B and 2, are a plurality of lesser secondary cylinder members 26, 28, and 30. Cylinder member 28 abuts against and is supported by end plate 22. Cylinder member 26 abuts against and is supported by plate 34. Cylinder member 30 abuts against and is supported by plate 34. Cylinder members 26, 28, and 30 define a main cylindrical channel 40 and a plurality of channels 50, 60, and 70 concentrically disposed around channel 40.

As seen in FIGS. 1A and 1B, the cylinders are assembled in order from largest to smallest. The mixing equipment is designed to provide vigorous agitation within the tank, and provide for a homogenous mixture of solids and alkaline material. With my improved digester, adequate mixing for environmental compliance is accomplished by the diffusion of air/gas and the rotation of the digester which is sized for the amount of flow.

In FIGS. 1A and 1B, the main horizontal cylindrical channel 40 discharges fluid from the open end (the right end as shown in FIG. 1B) into a second channel 50. The fluid communication is accomplished from the open end of cylinder member 26 into channel 50, as seen in FIG. 1B. In the preferred embodiment, the path of fluid flow is designed to avoid any stagnant spots in the fluid flow pattern. Similarly, channel 50 discharges fluid from the open end (the left end as shown in FIG. 1A) into a third channel 60. The fluid communication is from the open end of cylinder member 28. At the opposite end (the right end as shown in FIG. 1B) channel 60 in turn is continuous with channel 70. Again, the fluid communication is through the open end of cylinder member 30.

As seen in FIGS. 1A and 2, the static mixer 45 and the cylinders 26, 28, and 30 connected thereto are each fastened alternatively to end plate 22 and plate 34. Additionally, as seen in FIG. 2, between the cylinders there are supporting structures, struts 300, which extend radially outward from the outside of each cylinder across the channel to the interior surface of the next larger cylinder for spacing and stability. Each strut is long enough to span the space between cylinders and welded to each cylinder. In the preferred embodiment, each strut is 0.6096 to 0.9144 meters (2 to 3 feet) long. Each strut also tends to maintain the sludge sufficiently aerated and in suspension, in addition to its physical support function. There is little interference between the air/gas distribution pipes and the struts because they run parallel to each other within each cylinder.

As seen in FIG. 1A, channel 70 is in fluid communication with end chamber 80. This fluid communication between channel 70 and end chamber 80 is through exhaust ports 72 by traversing openings in end plate 34. The discharge from end chamber 80 is fed into an annular sewage discharge pipe 84 where it proceeds via slip fitting 87 into exhaust gas annulus 86. The biomass then proceeds upwards through discharge pipe 88. The height of discharge pipe 88 determines the maximum liquid level and attendant back pressure within digester 10. The discharge pipe is equipped with deep packing at slip fitting 87, which permits slippage between pipe 84 and plenum 302 without significant leakage.

Figure 3A:
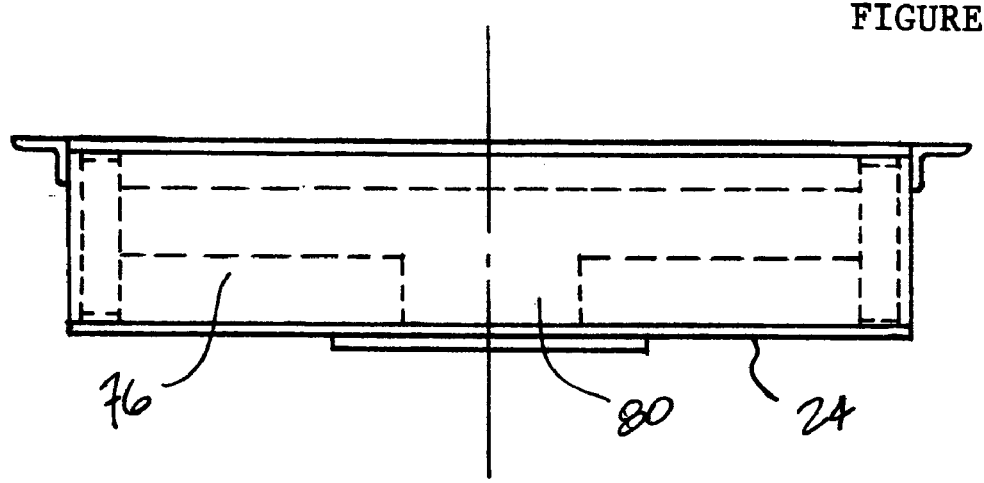
FIG. 3A and 3B: Illustrates in detail a discharge plenum with vortex blades for sweeping up debris.
Figure 3B:
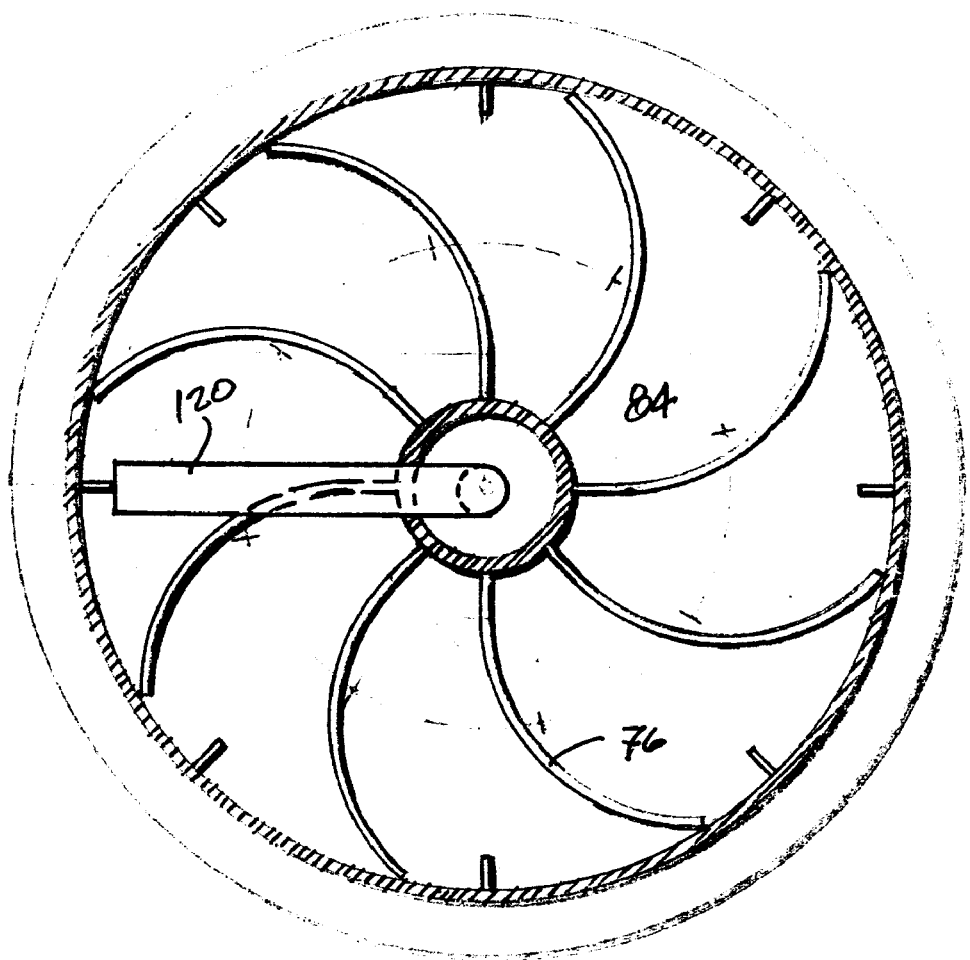

As seen in FIG. 3A, end-chamber 80 is fitted with vortex discharge blades 76, which are generally arcuate in shape and occupy much of the width of end chamber 80. The vortex discharge blades 76 are curved to lift and propel the channelled biomass to the neck 89 of the digester which extends the digester beyond plate 24 and which rotates with the digester. Supporting that end of the digester 10 is a journal bearing 66, around and coaxial with a portion of the exhaust gas annulus 86 which surrounds the air/gas exhaust pipe 120 and is connected to a plenum 302 for the discharge pipe 88 for fluids. That pipe 88 is tapped by a valve 103 (not to scale) to draw off fluid. End chamber 80 is gasketed and bolted to the main cylinder plate 34. Such an arrangement will cause any sand or other detritus matter located at the bottom of end chamber 80 to be swept out and into the annular sewage discharge pipe 84.

The sewage feed apparatus is shown generally at the right end of digester 10, as illustrated in FIG. 1B. The feed apparatus comprises raw sewage feed piping 90 which joins at a slip fitting 85 the horizontal feed pipe 92 at the center of the digester. The slip fitting 85 is packed with appropriate stuffing to prevent leakage. Raw sewage from pipe 90 moves through pipe 92 into central cylindrical channel 40 passing through an in-line mixer 45 of the type often referred to as "motionless" or "static". Without agitators or moving parts, this kind of mixer is well suited to anaerobicly homogenize the sewage before aeration. The in-line mixer 45 is just a tube packed with screw sections, alternatively left and right handed 44. The biomass then doubles back through channel 40 and continues outwardly and back and forth through secondary cylinder members 50, 60, and 70.

Figure 6:
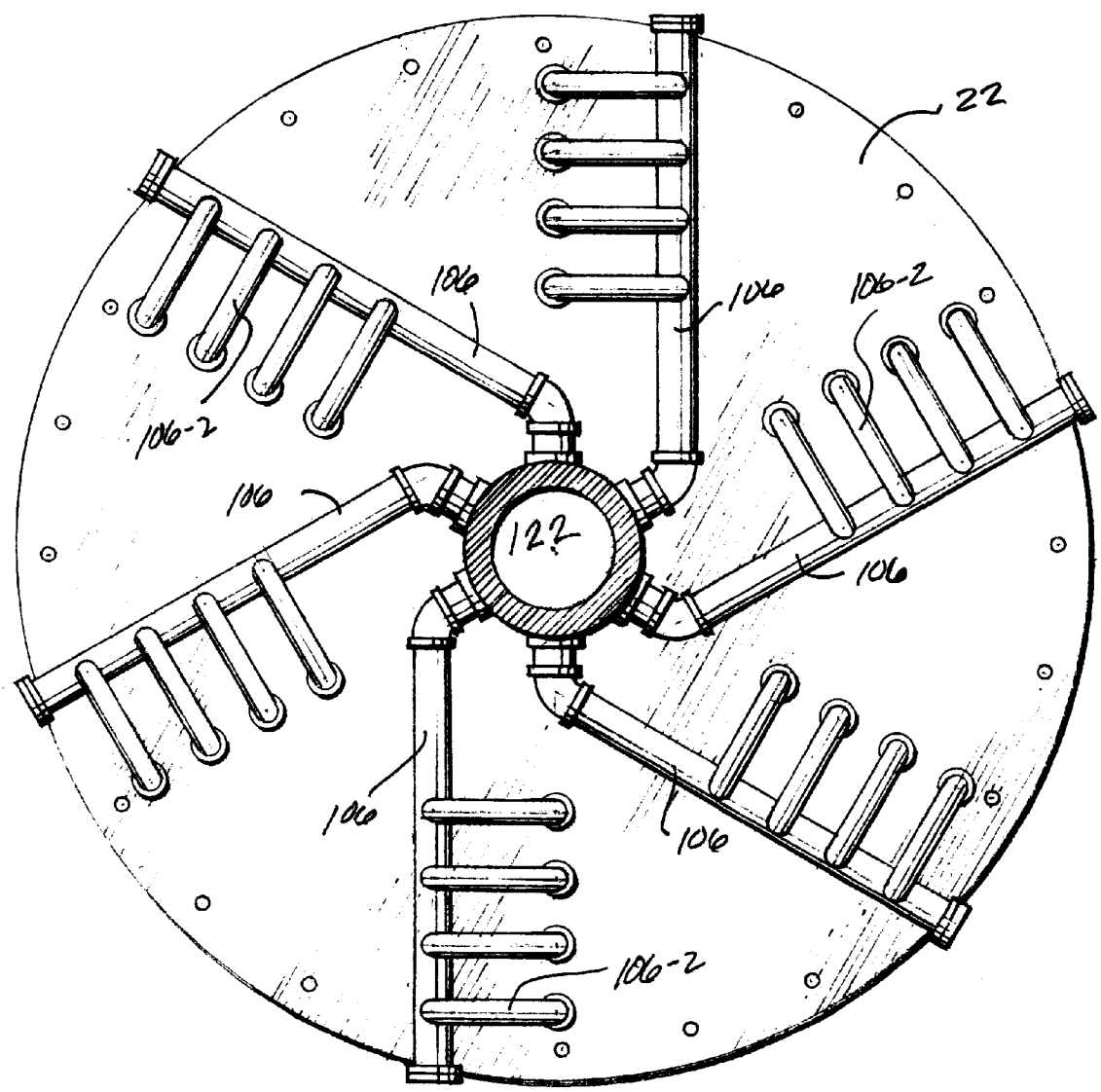
FIG. 6: Illustrates a cross-sectional expanded view of a portion of FIG. 1B with all exterior air distribution pipe branches connected directly to an air plenum.

In FIGS. 1A and 1B, sewage is introduced to the digestion process on emerging from the in-line mixer 45. The air/gas injection mechanism is located at the same horizontal end (right end) of the digester as is the feed mechanism for sewage input. The diameter of the pipe for the air injection is considerably greater than that for sewage input. My invention contemplates an air/gas-feed pipe 100 connected to a compressor air/gas source 104. The source injects air/gas during the digester's operation. The gas-feed pipe 100 feeds into plenum 124, which in turn supplies an air reservoir 122, as seen in FIG. 1B. Reservoir 122 is connected to an array of header pipes 106, which are equally spaced radially around reservoir 122, as seen in FIG. 6. Plenum 124 is contiguous with reservoir 122 so that the fittings for slip joint 125 meet end plate 22 as seen in FIG. 1B.

As seen in FIG. 1B, reservoir 122 is discharged through a tapered sleeve 123 which functions as a gate and admits air/gas to the branch headers 106. This arrangement allows fresh air/gas to enter the air/gas head distribution system at a designated rate, as will be detailed below. See FIG. 1B. The tapered sleeve 123 regulates feeding only the diffusers 75 (not shown here) below the bottom ⅔ of each secondary cylinder 26, 28, and 30. Adjustment of sleeve 123 alters the feeding to the diffusers.

As seen in FIGS. 1B and 6, air reservoir 122 rotates with digester 10 and is open to plenum 124 which receives fresh air from the source 104. This differential movement is accommodated by a slip joint 125. Reservoir 122 is the means which directly supplies the branch headers 106 successively with fresh air/gas as the tapered fitting 123 opens to them (See FIGS. 1B and 6) and, thus, functions as the main air manifold as controlled by tapered fitting 123. In the preferred embodiment, six branch headers 106 extend from the air reservoir 122 of the commutating valve to form a star configuration in a branching system, as shown in FIG. 6.

Figure 4:
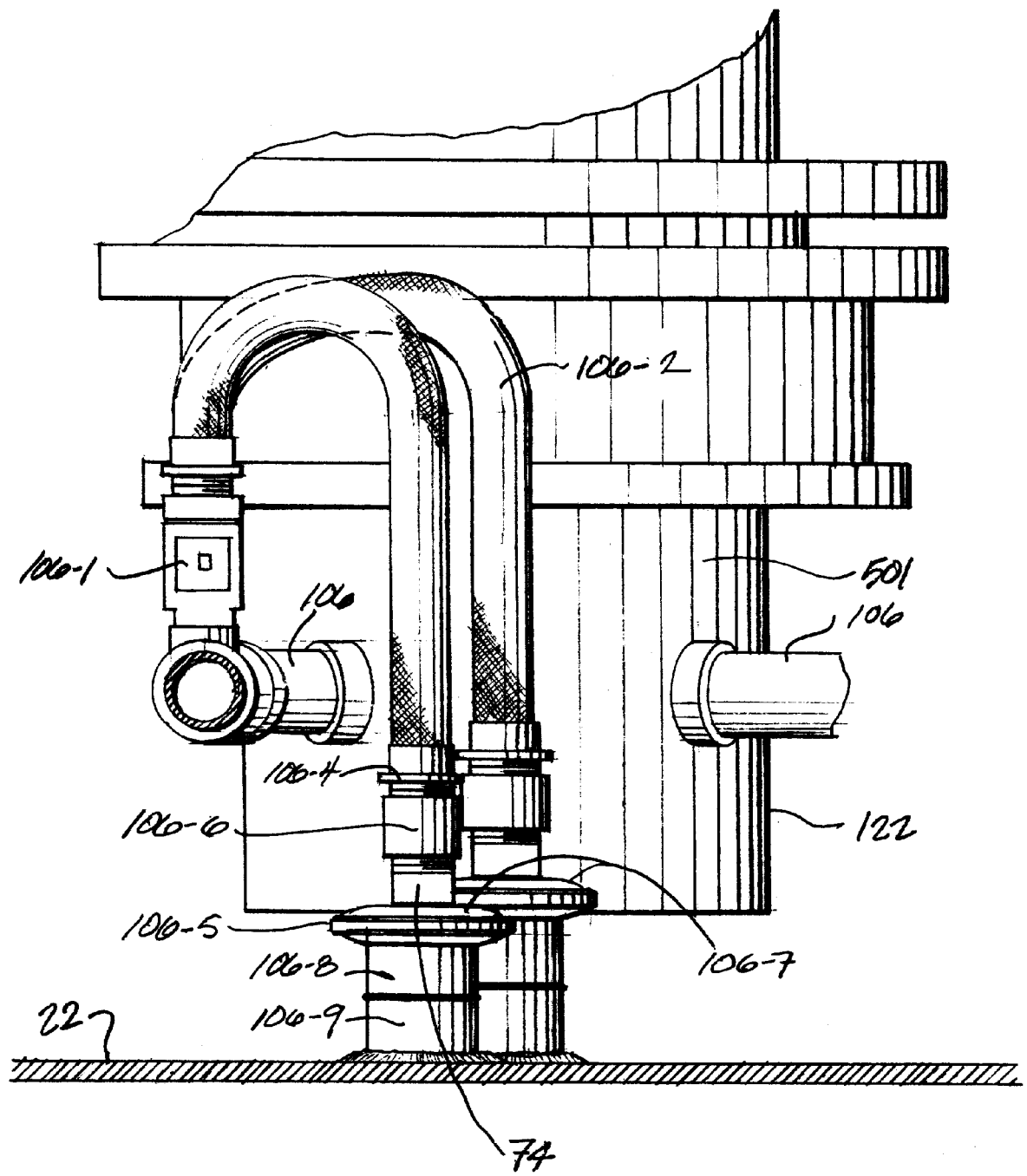
FIG. 4: Illustrates in detail the air pipe and tubing attachments on the exterior surface of the end plate of the digester.

FIG. 4 is a detailed illustration of a branch header 106 as it extends radially from reservoir 122 and branches into distribution hoses 106-2 as it approaches end plate 22. Valves 106-1 open to connect each branch header 106 to each of the distribution hoses 106-2, each of which deliver air/gas to one of the air/gas distribution arms 74. Valves 106-1 are preferably ball valves made of the plastic neoprene. Each valve 106-1 fits an end of a distribution hose 106-2. The rubber hose fittings are flexible and reinforced with a wire mesh. The other end of each distribution hose 106-2 terminates with a threaded pipe coupling 106-4 which connects to a flanged coupling 106-6. This flanged coupling 106-6 is welded to the end of the air/gas distribution arm 74. The pressure applied to the pipes is approximately 15 psi (pounds per square inch).

Figure 8:
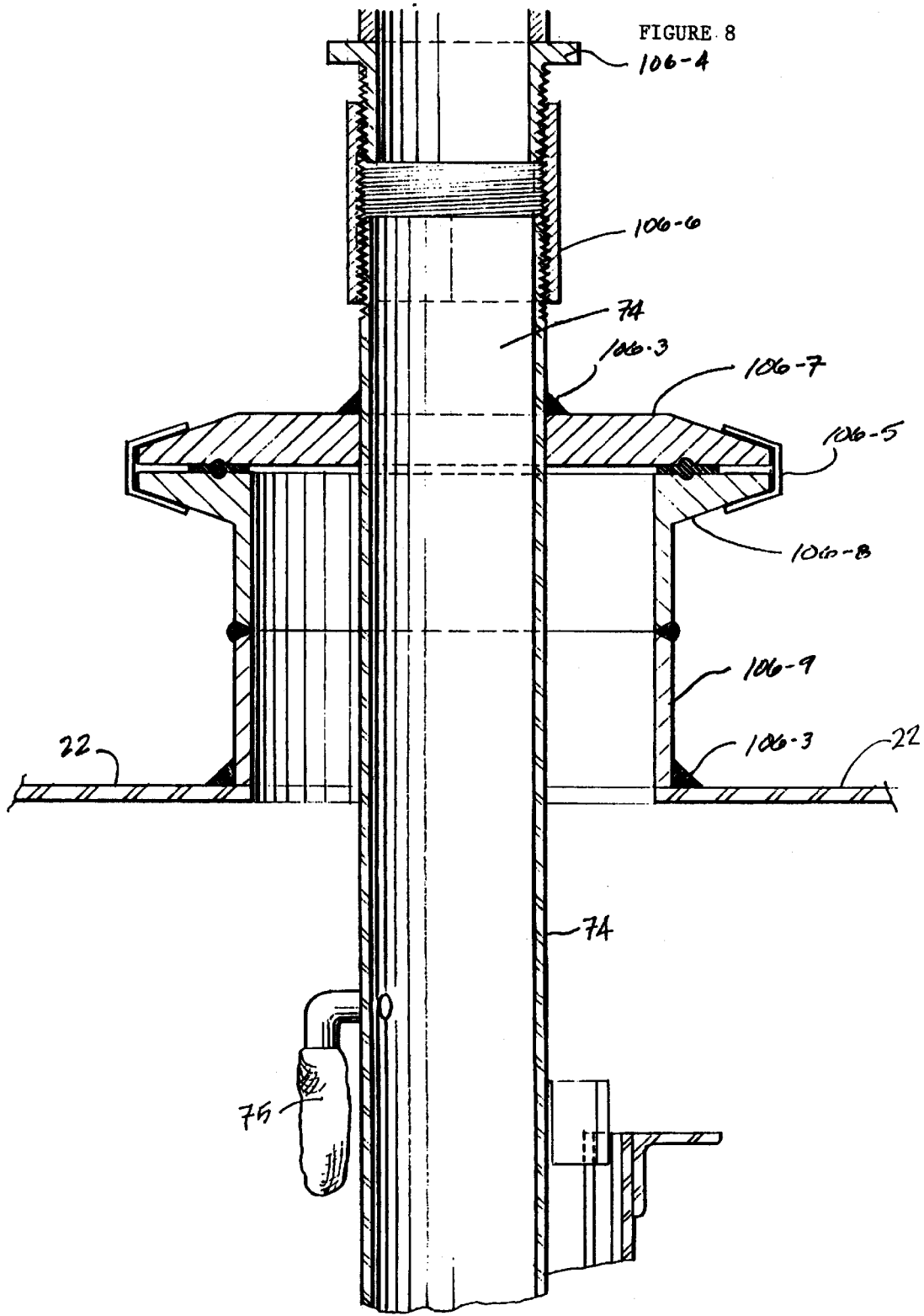
FIG. 8: Illustrates in detail the clamping mechanism on each air/gas distribution pipe.

Any air/gas distribution arm 74 is generally coupled to the distal end of the hose while in operation, and enters the digester through end plate 22. FIG. 8 illustrates in detail how triclover 106-5 achieves tension support of a typical air/gas distribution arm 74 exterior to end plate 22. Welded (106-3) to movable arm 74 is a flange 106-7, (which is a part of a triclover fitting), while a second flange 106-8 is welded to pipe immovable plug nipple 106-9, which in turn is welded to end plate 22.

As seen in FIG. 8, air/gas distribution arm 74 can slide toward flange 106-8 until both flanges, 106-7 and 106-8, abut each other. Triclover 106-5 is then applied by the operator to lock together the abutting rims of the flanges, 106-7 and 106-8, thereby fixing pipe 74 in a single position. To loosen arm 74, clamp 106-5 is removed and flange 106-7 is manually disengaged from flange 106-8. The operator can now manually withdraw arm 74 completely through its opening in end plate 22. It is imperative that the diameter of these openings in end plate 22 be comfortably wider in diameter than arm 74 providing maneuverability of an arm of any length into and from a particular cylinder.

FIG. 1B illustrates a transverse detailed view of air/gas head distribution system. Branch headers 106 directly supply fresh air via distribution hoses 106-2 to a series of air/gas distribution arms 74 that run the length of each cylinder member. Specifically, each distribution hose 106-2 at Triclover 106-5 empties its air into an arm 74 exterior to end plate 22. As best seen in FIG. 5B, in the preferred embodiment these distribution arms 74 have small but numerous aerators or air diffusers 75 on their exterior surfaces. Alternatively, a string of porous sintered alumina tubes 51 can be used without the use of attached air diffusers 75. See FIG. 9. Porous tubes 51 or air/gas distribution pipes 74 with attached diffusers 75 comprise the novel means of aerating the digester 10 in my invention because they can be easily removed and cleaned, as will be explained in more detail below. The preferred embodiment of the invention also contemplates a plurality of air/gas distribution arms 74 within each cylindrical member, as seen in cross-section in FIG. 2.

Figure 5A:
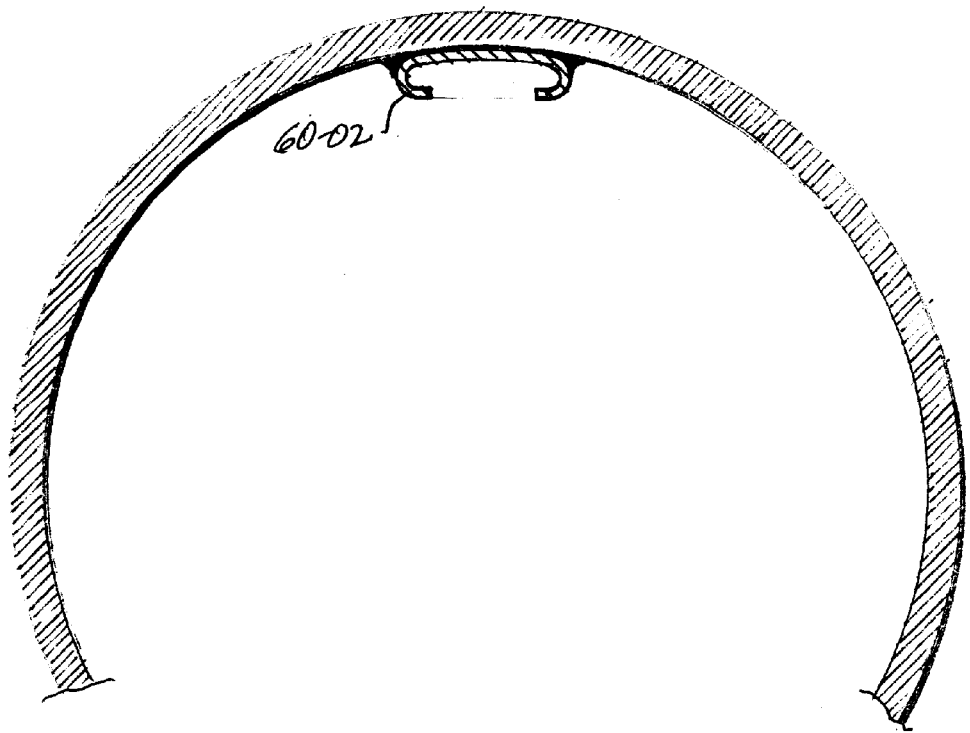
FIGS. 5A and 5B: Illustrate in cross-section the welded supports and rails on the inner surface of a cylinder which guide and support the air-distribution pipes with attached air diffusers.
Figure 5B:
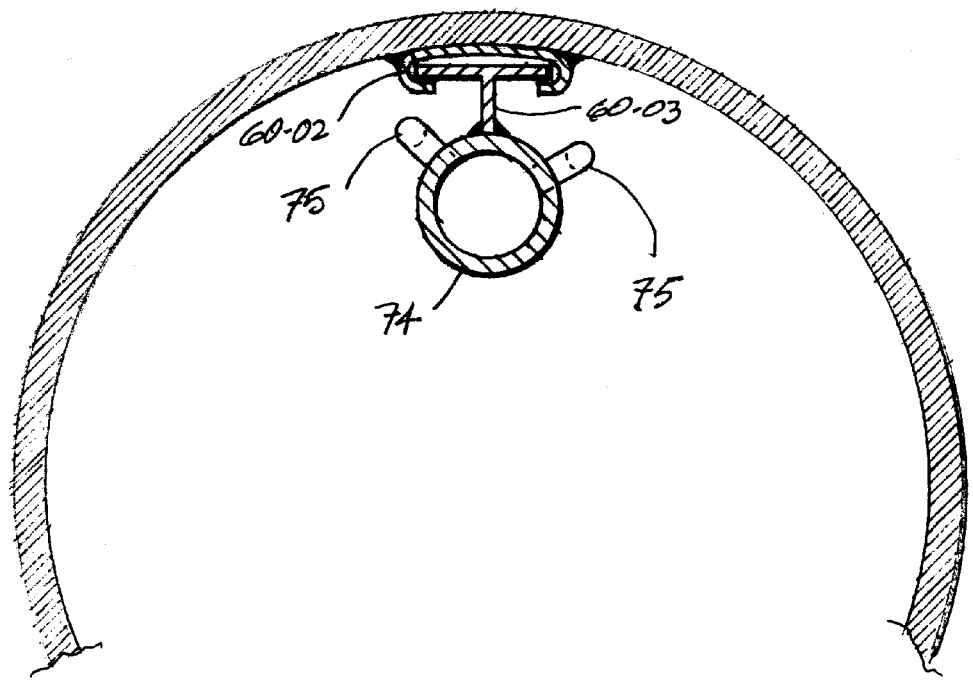

As seen in FIG. 5A in cross-section, along the inner surface of each cylinder in digester 10, such as 26, 28, and 30 are welded small slotted metal means known as air header rails 60-02. FIG. 5B also illustrates in cross-section header support hangers 60-03, which are connected to the air/gas distribution arms 74 with heads to slide smoothly through slots in the rails 60-02, and which thus form a sort of slotted raceway. Support hangers 60-03 hold the arms 74 in alignment while they are functioning within the digester. For example, arm 74 can be threaded from the cylinder member interior by guiding the pipe support hangers 60-03 through the rails 60-02. Simultaneously, flanges 106-7 and 106-8, held together by clamp 106-5, are loosened on the exterior of end plate 22. The clamp had previously been holding arm 74 in a vise-like grip within the welded flanges so that arm 74 stiffly traversed end plate 22. Because of both the clamp/flange arrangement and the header rail/support hanger system, air/gas distribution arms 74 can easily enter and exit through end plate 22 for cleaning and inspection.

In sum, header air/gas distribution pipes 74 are coupled to branch header 106 by distribution hoses 106-2. The arms 74 are partially stabilized as they traverse openings in end plate 22 by an operator tightening or loosening the flanges 106-7 and 106-8 within Triclover 106-5 as shown in FIG. 8. These arms 74 in effect function as pipe strings which fit into the slotted raceways as they are manually guided into and from the digester interior. In this manner, the operator can release the arm 74 from the hose 106-2 and opening through end plate 22 by releasing the opposing flanges 106-7 and 106-8 using the Triclover 106-5. Alternatively, arm 74 can be inserted through end plate 22 and stabilized in a longitudinal position within a cylinder member by manually clamping the flanges 106-7 and 106-8 together. Air/gas distribution arm 74 similarly can re-enter a cylinder member through end plate 22 where it is stabilized in a longitudinal position by manually tightening the flanges 106-7 and 106-8 with Triclover 106-5. The operator then carefully threads the remainder of the arm 74 within the cylinder walls using pipe supports 60-03 through the rails 60-02. As a result, any air/gas distribution arm 74 can be completely removed from or re-enter the digester (See FIG. 1B).

This arrangement is completely different from that claimed and disclosed in U.S. Pat. No. 3,720,320 (Fletcher) in which the aerating means were directly and irrevocably welded to the cylinder surfaces. Moreover, the couplings between arm segments are sufficiently strong to support 50 or more feet of arm 74 along the rails 60-02. Further, support hangers 60-03 are required only for every 73.66 centimeters (29 inches) of arm 74, although these same segments of pipe must be supported every 1.22 meters (4 feet).

As seen in FIG. 1A, the air/gas exhaust pipe 120, because of its location with respect to slip joint 104, does not rotate with the digester 10. Air which is in the uppermost portion of channel 70 vents over the rim of the end plate 34 down into the open end of the vertical leg of the air/gas exhaust pipe 120. Pipe 120 turns outward along the axis of the digester and through plenum 302. The gas exhaust from pipe 120 may be subjected to chemical analysis to control the digester's operation. Such a monitor is helpful in maintaining optimum metabolic conditions.

The air/gas distribution arms 74 for the various channels are of the same general construction. It is also important that the volume of the main horizontal cylindrical channel 40 be approximately equal to the volume of each of the channels. This is so each pass has the same cross-sectional area and, thus, the volume of material is the same and requires the same volume of air. In the preferred embodiment, all of the channels are provided with air/gas distribution arms 74, as illustrated in FIG. 2. Also in the preferred embodiment, the number of such air/gas distribution arms 74 with diffusers 75 are the same for each cylinder.

It is apparent to one skilled in the art that the air/gas distribution arms 74 can control the temperature at which the digester operates. For instance, heated gas may be used to increase the temperature of the digester, while cooled air/gas can lower the temperature. Appropriately located thermocouples can provide convenient sensing of the temperatures throughout the digester. Further, in the preferred embodiment, the central initial channel forms a so-called "motionless mixer" 45 with alternate left- and right-hand screw sections 44. As the sewage influx progresses, the screw sections 44 divide and recombine the sewage many times to deliver a completely homogeneous sewage into the main horizontal cylindrical channel 40.

In the preferred embodiment, the main horizontal cylindrical channel 40 and the several channels surrounding channel 40 are approximately equal in cross-sectional area. This arrangement provides approximately equal flow rates for the material moving through the digester in all parts of the system.

Referring to FIGS. 1A and 2, drive means 16 may be a duplex variable speed motor and transmission assembly for digester rotation either clockwise or counter-clockwise at variable speeds. See in particular FIG. 2. Generally, in the preferred embodiment, the digester rotates in a clockwise direction.

If sewage of varying consistency are to be treated, pipe 88 (FIGS. 1A and 7) may be equipped with an adjustable pipe clamp, as well as a detector and sensors, should air/gas not meet code requirements. Any appropriate auxiliary instrumentation will do for this specific purpose. To take maximum advantage of the digester's full volume, in the preferred embodiment, pipe 88 has an elevation approximately 2.54 centimeters (1 inch) below air/gas exhaust pipe 120 and 7.62 centimeters (3 inches) below the top of digester 10.

Figure 7:
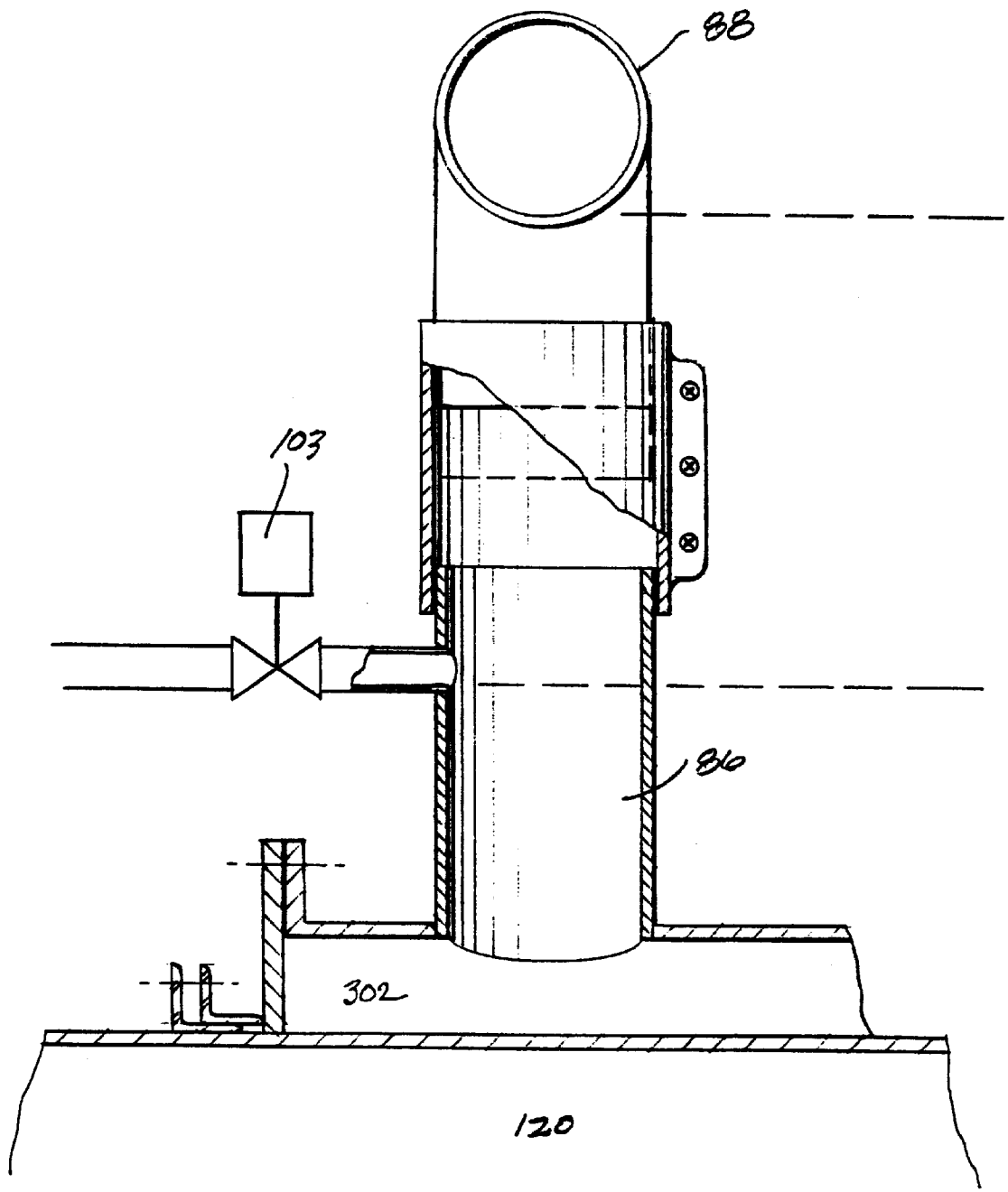
FIG. 7: Illustrates the valve means responsible for regulating the level in the digester of the sewage in treatment.

For removal and cleaning of the air/gas distribution arms 74, the rotation of the digester is first halted, as is the flow of raw sewage. As seen in FIG. 7, the discharge pipe 88 is equipped with a valve means 103 which can be set to lower the level of material to 75% liquid at the bottom of the digester. With valve means 103 open, the excess liquid is returned to the end chamber 80. During cleaning, the compressor remains operational to feed the balance of air/gas distribution arms which remain submerged. Next, the four air/gas distribution arms 74 in the vertical position are removed and Triclover 106-5 is loosened to separate flanges 106-7 and 106-8. After inspection and cleaning, arms 74 are reconnected to branch headers 106 via distribution hoses 106-2 and coupling devices. The digester is then rotated to the next set of air/gas distribution arms 74, so that the digester is never completely drained and always remains operational.

The present invention also contemplates various forms and modifications to the air/gas distribution system and branches. For instance, reservoir 122 (FIG. 6) is equipped with orifice control. This feature permits air and gas flow only when the diffusers 75 (FIG. 8) are below the level of the liquids or during the lower part of their rotation. In addition to using the ceramic type of aerator described as the preferred embodiment, one may use permeable or porous diffusers made of metal powders, cloth, fabric, paper, plastic, glass or other similar materials. Also in the preferred embodiment, headers or diffusers are made from porous materials so that the bubble sizes of the air and gases in the digester are closely monitored.

In my digester, no sludge is produced but only water, gas, and pieces of metallic and silica debris such as copper and sand. This is because the sludge is recirculated and has time to literally digest itself. In this invention, particles are always in suspension so there are no local velocities around the diffuser to attract the sludge back to the arms 74.

In the operation of the improved digester, the crucial parameters are adjusted for the most efficient digestion of the feed materials. For instance, when the feed sewage is high in solids content, the digester's rotational speed and air volume may be altered to give the feed a higher retention time. Similarly, when the feed is diluted, the retention time can be controlled by the rate at which raw sewage is introduced. Metering devices in connection with the feed flow rate are an accurate method of regulating the retention time and monitoring the digestion process. Similarly, temperature may be controlled via feed temperature, the gas temperature, by the use of a waterjacket (not illustrated) or other heat exchanger devices. It is contemplated that the retention time will vary between a few hours and a few days, depending upon the nature of the sewage and other factors known to those skilled in the art.

The digester may also be utilized as a pretreatment unit for certain types of unusual effluents. For example, discharge from certain commercial plants exhibit high B.O.D. (biochemical oxygen demand) and/or concentrated effluent which drain into central municipal sewage facilities. My improved digester of the present invention may replace conventional sewage treatment plants or be used in new installations. It can also be used with conventional auxiliary equipment and processes. For instance, chemical feed systems which condense the material to be digested or precipitate the recovery of substances of value may be added before or after digestion.

Acidity and alkalinity control systems may be used and may include the monitoring of pH within the digester. The usual grinding, pulverizing and shredding machines which are conventionally used to break up paper and paper products and other solid materials found in sewage may also be used on the feed before it is introduced into the digester.

Separator systems which are used to remove paper fiber or fats and oils and other materials such as centrifuging-type separators, flocculation tanks, screens, filters, electrostatic systems, precipitation systems, evaporation systems and others may also be used before or after passing the material through the digester.

Conventional reservoirs or holding tanks are best used to provide the digester with a constant feed. Recycling systems, wherein the bacterial cell masses are separated from the water and recycled through the digester, may also be used. For instance, discharge pipe 88 may be provided with a means to recycle a portion of the treated material back into the main cylindrical opening with the raw sewage arriving through feed pipe 90 (FIG. 1B).

As will be obvious to those skilled in the art, it is desirable to equip the digester with inspection manholes which permit access to the interior thereof for purposes of maintenance and observation. As was mentioned above, end plates 22 and 24 are removable in whole or in part to facilitate servicing the digester. The digester may be constructed from any convenient material, but generally stainless steel or other non-oxidizing ferrous based metals are preferred.

The entire system of the digester depends primarily upon a bacterial injection scheme wherein bacteria can flourish. The digester can be a large size because the bacteria can grow in temperatures up to 65.55° C. (150° F.) while air is delivered through the complete mass. Moreover, the improved digester can be built to any length. The improved functional features of my invention allow for the easy removal of the air/gas distribution arms 74 and diffusers 75 for cleaning, as well as exit and entrance means for both air/gas and sewage at opposite ends of the digester.

As a result, my improved digester is easily capable of compliance with current environmental codes. Under most regulations, the design of a sewage treatment device should include adequate aeration and mixing to prevent septicity. My digester can meet the domestic waste treatment requirements. The pipes, diffusers and nozzles which are particularly susceptible to clogging are physically cleaned or flushed. Similarly, the spacing of the air/gas distribution arms 74 in my improved digester can comply with appropriate oxygenation requirements as set forth by the local government environmental codes. My invention is designed to facilitate adjustments of air diffuser spacing without major revision to the air/gas distribution arms 74. The diffuser 75 in any single assembly also has substantially uniform pressure loss because of my previously discussed design.

More than one digester should be installed in a given facility for continuous operation should a particular digester be disassembled to clean the entire air/gas distribution means. Pipes subject to clogging are provided with means for mechanical cleaning and/or flushing. As known to those skilled in the art, flow measurement facilities can be provided so as to measure effluent and influent flow as currently required for a National Pollution Discharge Elimination System (NPDES) discharge permit.

It is contemplated that this invention will be used primarily to aerate sewage. However, the structure may be used to add carbon dioxide, chlorine, ozone or oxygen to organic matter, sewage and other materials. By use of the term "gas" in the specification and claims it is intended to cover such gases and mixtures of them, with or without air.

The specification contemplates that the structure comprise a plurality of concentric cylinders. It would also be possible to approximate the flow patterns and piping arrangements of the digester as shown and described based on constructions which are not true "cylinders." Indeed, the digester disclosed in the patent teaches that the inner cylinders may be tapered in the direction of liquid flow. The "cylinders" then are actually "truncated cones." The flow pattern and arrangement of parts may also be achieved in a structure made up of flat sheets in the form of a prism, a prismatoid, or a prismoid wherein the end plates are parallel congruent polygons. Currently, steel manufacturers have the capability to fabricate large and sturdy rollers to form steel sheets into cylinders of any size. Thus, the digesters may be fabricated by welding, riveting or bolting together cylindrical and flat pieces. Similarly, the end plates need not be flat but may be domes as the design and fabrication methods dictate. Nevertheless, the preferred embodiment remains the structure with substantially flat end plates joined by substantially cylindrical portions.

In sum, my improved digester using aerobic means provides adequate mechanical mixing and maintains solids in suspension. The mixing equipment is designed to provide vigorous agitation within the tank and provide for a homogenous mixture of solids and alkaline material. With my improved digester, adequate mixing for environmental compliance is accomplished by diffused air and rotation of the digester which is sized for the amount of flow. My improved digester also has spacing of diffusers in accordance with current oxygenation requirements throughout the length of the cylinders.

Individual assembly units of aerators are equipped with control valves. The air/gas distribution arms 74 are provided in multiple units, so arranged, and in such capacities to maintain all biological solids in suspension, meet maximum oxygen demand and maintain process performance even with the main cylinder out of service.

In the preferred embodiment, suction and discharge piping should be sized by the rate of flow and should be designed to maintain a velocity of not less than 0.610 meters (2 feet) per second when return sewage facilities are operating at normal rates. The improved digester as shown and described here is to be considered only as illustrative. It will be apparent to those skilled in the art that numerous modifications may be made therein without departure from the spirit of the invention or the scope of the appended claims.

I claim:

1. In an improved rotary digester for raw sewage
   A. of the kind comprising:
   (a) a horizontal cylindrical shell;
   (b) end members for said shell forming liquid-tight seals with said shell;
   (c) rotating means adapted to rotate said shell about its long axis;
   (d) a plurality of reaction cylinders mounted within said shell, concentric thereto, whereby there are defined a central axial channel and a plurality of annular channels encircling said axial channel at successively greater radial distances from said axis said reaction cylinders adapted to be rotated with said shell;
   (e) end members for each of said reaction cylinders; and
   (f) said central axial channel having on end thereof in fluid communication with said annular channel adjacent thereto, each of said annular channels being in fluid communication with the next adjacent annular channel, at alternating ends, thereby defining a liquid-flow path through the length of said central channel and then back and forth through each of the successive channels;
   B. the further combination of:
   (a) axial feed means adapted to introduce feed into one end of said axial channel;
   (b) gas supply means for delivering air/gas to said feedstock; and
   (c) wherein a plurality of air/gas distribution means are longitudinally disposed parallel to the axis of said shell and spaced apart effectively to aerate the contents of said digester;
   wherein the improvement comprises:
   an air-flow modulating and distribution valve, said modulating and distribution valve having input from a cylindrical plenum coaxial with said main axis, and a manifold for distribution to said air/gas means comprising a plurality of arms removable through ports in one of the end members of said shell.

2. An improved horizontally rotary continuous-feed digester comprising:
   (a) a reactor vessel in the shape of a prismoid, having end plates which are parallel and similar regular polygons, the centers of which turn on the horizontal main axis of rotation of said vessel;
   (b) end members forming a liquid-tight seal with side pieces of said vessel;
   (c) rotating mean adapted to rotate said vessel about said axis;
   (d) a plurality of prismatoid reaction chambers similarly shaped to said vessel, and concentrically carried therein, whereby there is defined a central axial channel, within the smallest of said chambers, a first annular channel between the outside of said smallest chamber and the inside of a second chamber, and a plurality of larger annular channels radiating from said axial channel;
   (e) said chambers adapted to be rotated w with said vessel;
   (f) in further combination with e nd pieces for each of said chambers;
   (g) axial feed means adapted to introduce feedstock into the input end of said vessel to said axial channel;
   (h) wherein the other end of said axial channel is in fluid connection with an annular opening of a second said chamber;
   (i) axial air/gas supply means for delivering air/gas to said vessel, through the air/gas end of said vessel;
   (j) air/gas distribution means for supplying air/gas to said feed;

(k) wherein a plurality of air/gas distribution means are longitudinally disposed parallel to the axis of said vessel, said means spaced to optimize the digestion of a biomass;

wherein the improvement comprises:

an air-flow modulating and distribution valve, said modulating and distribution valve having input from a cylindrical plenum coaxial with said main axis, and a manifold for distribution to said air/gas means comprising a plurality of arms removable through ports in one of the end members of said shell.

3. In a digester as defined in claim 2, the improvement characterized in that:

A. said plurality of air/gas distribution means each comprise:

(1) pipe string substantially the length of said chamber, said pipe string supporting and supplying through fittings with diffusers to dispense air through holes so tiny that back-flow is limited, and very tiny bubbles of air emerge;

(2) each said pipe string fitted with hangers with heads to engage a slotted raceway fixed to an assigned chamber and leading to a port in the end plate of said vessel at the input end of said digester;

(3) each port fitted with means to hold said pipe string input end in secure and fluid-tight connection to said end plate;

(4) the end of each said air/gas distributor pipe in connection to a hose which in turn connects to an air header, said air header joining a group of hoses from similar said distributor arms, each said air header fed from a distributor valve which rotates with said digester vessel and modulates the air/gas flow as the valve ports to the headers are modulated by a cylindrical gate which remains fixed as the valve rotates, increasing the flow where needed, said valve reducing said flow when a distributor air/gas arm rises above the fluid level in said digester; and (5) wherein said outflowing air/gas is bled off at the top of the output end of said digester, said output end being opposite from said input end, said excess material exiting at said output end of said digester.

4. An improved horizontal, rotating, continuous-feed digester comprising:

(a) a horizontal cylindrical shell;

(b) end members for said shell forming a liquid-tight seal with said shell;

(c) rotating means adapted to rotate said shell about its axis;

(d) a plurality of reaction cylinders mounted within said shell, concentric thereto, whereby there are defined a central axial channel and a plurality of annular channels radiating from said axial channel at an end thereof;

(e) said reaction cylinders adapted to be rotated with said shell;

(f) end members for each of said reaction cylinders;

(g) axial feed means adapted to introduce feed into one end of said axial channel;

(h) wherein the other end of said channel is in fluid connection with an annular opening of a second axial channel within a second reaction cylinder;

(i) axial air/gas supply means for delivering air/gas to said shell;

(j) air/gas distribution means for supplying air/gas to said feed; and (k) wherein a plurality of air/gas distribution means are longitudinally disposed parallel to the axis of said shell along different radii within said shell, said improvement characterized in that said air/gas distribution means comprise a plurality of removable arms.

5. An improved horizontal, rotating, continuous-feed digester for a fluid biomass comprising:

(a) a horizontal cylindrical shell;

(b) a first end member for said shell forming a liquid-tight seal with said shell at one end thereof;

(c) a second end member for said shell forming a liquid-tight seal with the second end of said shell;

(d) rotating means adapted to rotate said shell about its long axis;

(e) a plurality of reaction cylinders mounted within said shell, concentric thereto, with an end of each said reaction cylinder supported on said first end member;

(f) a third end member generally normal to said axis, and separated from said second end member by an end chamber and supporting the other ends of said reaction chamber;

(g) whereby there are defined a central axial channel, and a plurality of annular channels, coaxial therewith at incrementally greater distances from said axis;

(h) said third end member, said reaction cylinders, and said end chamber adapted to be rotated with said shell;

(i) axial feed means adapted to introduce feedstock into one end of said axial channel;

(j) wherein the other end of said channel is in fluid connection with a first reaction cylinder, and each of said annular channels being in fluid communication with the next adjacent annular channel at alternating ends, thereby defining a liquid flow path through the length of said central axial channel and back and forth through each of the successive annular channels;

(k) axial air/gas supply means for delivering air/gas to said shell;

(l) air/gas distribution means for supplying air/gas to said feed; wherein:

(i) a plurality of air/gas distribution means are longitudinally disposed parallel to the axis of said shell along different radii within said shell;

(ii) said improvement characterized in that:

said air/gas distribution means comprise a plurality of air header arms, each said arm carried by pipe hangers engaging in a slotted raceway, said pipe hangers welded to one of said cylinders, for each said arm a flanged end connector whereby said arms may be removed without shutting down the digester.

6. A digester as defined by claim 1, wherein each of said arms comprises a string of diffuser pipe sections, each of which has a female threaded end and a matching male threaded opposite end, and with a pipe hanger fitting to provide desired stand-off of diffusers from other structures, said hanger comprising a link to maintain the stand-off distance, having a head on one end to engage a slotted support rail, and a ring at the other end, said ring to be held between said threaded ends at each connection of said pipe string.

7. An improved digester as described in claim 4, wherein said sewage and air/gas exit and enter at opposite ends of said digester.

8. In a continuous-feed, rotating digester which comprises:

(a) a horizontal cylindrical shell;
(b) end members for said shell forming a liquid-tight seal with said shell;
(c) rotating means adapted to rotate said shell about its axis;
(d) a plurality of truncated conical reactors mounted within said shell, concentric thereto, whereby there are defined a central axial channel and a plurality of annular channels radiating from said axial channel at an end thereof;
(e) said reactors adapted to be rotated with said shell;
(f) end members for each of said truncated cones;
(g) axial feeding means adapted to deliver material as feedstock into one end of said axial channel;
(h) the improvement wherein the other end of said axial channel is in fluid connection with a first truncated cone; (i) axial air/gas supply means for delivering air/gas to said shell;
(j) air/gas distribution means for supplying air/gas to said feed;
(k) wherein a plurality of air/gas distribution means are longitudinally disposed parallel to the axis of said shell along different radii within said shell, the improvement characterized in that:
removal of said air/gas distribution means connected to said diffusers for cleaning and inspection through ports in said shell without completely halting the operation of said digester.

9. An improved horizontally rotary continuous-feed digester comprising:
(a) a reaction vessel in the shape of a slender prismoid, said prismoid having end plates parallel and of similar regular polygons, the centers of said polygons defining the horizontal axis of rotation of said vessel;
(b) end members for a shell enclosing said polygons, said members forming liquid-tight seals with side pieces of said vessel;
(c) means adapted to rotate said vessel about said axis;
(d) a plurality of progressively smaller prismoidal, reaction chambers, similarly shaped to said vessel, and concentrically carried therein, whereby there are defined a central axial channel within the smallest of said chambers, a first annular channel between the outside of said smallest chamber and the inside of a second said chamber, and a plurality of a larger annular channels radiating from said axial channel at an end thereof;
(e) said chambers adapted to be rotated with said shell;
(f) end pieces for each of said chambers;
(g) axial feed means adapted to introduce feedstock into the input end of said vessel to said axial channel;
(h) wherein the opposite end of said channel is in fluid connection with an annular opening of a second said chamber;
(i) axial air/gas supply means for delivering air/gas to said vessel through the air/gas end of said vessel;
(j) distribution means for supplying air/gas to said feed, wherein a plurality of air/gas distribution means are longitudinally disposed parallel to the axis of said vessel spaced to optimize the digestion of sewage, the improvement characterized in that:
A. said plurality of air/gas distribution means each comprise:
(1) a pipe string substantially the length of said chamber, said pipe string supporting and supplying through fittings with diffusers to dispense air through holes so tiny that back-flow is overcome, and very tiny bubbles of air emerge;
(2) each said pipe string is fitted with hangers with heads to engage a slotted support rail welded to an assigned chamber and leading to a port in the end plate of said vessel at the input end of said digester;
(3) each said port is fitting with means to hold said pipe string input end in secure and fluid-tight connection to said end plate;
(4) the proximal end of each air/gas distributor pipe being connected to a hose which in turn connects intimately to an air header, said air header joining a group of other hoses from distribution pipes, each said air header being fed from a distributor valve which rotates with said digester vessel and modulates said air/gas flow as the valve ports to said headers, said air/gas flow further modulated by a cylindrical gate which remains fixed as said valve rotates, said gate increasing the flow where needed, said gate reducing the air/gas flow when a distributor pipe rises above the fluid level in said digester;
(5) wherein outflowing gas, excessive air, carbon dioxide and methane are released at the top of the output end of said digester, said output end located opposite from said input end.

10. An improved horizontal, rotating, continuous-feed digester comprising:
(a) a cylindrical reactor vessel comprising end plates forming a shell;
(b) end members for said shell forming liquid-tight connections with the side pieces of said vessel;
(c) means adapted to rotate said vessel about said axis;
(d) a plurality of progressively smaller prismoidal, reaction chambers, similarly shaped to said vessel, and concentrically carried therein, whereby there are defined a central axial channel within the smallest of said chambers, a first annular channel between the outside of said smallest chamber and the inside of a second said chamber, and a plurality of larger annular channels radiating from said axial channel at an end thereof;
(e) said chambers adapted to be rotated with said shell;
(f) end pieces for each of said chambers;
(g) axial feed means adapted to introduce feedstock into the input end of said vessel to said axial channel;
(h) wherein the other end of said channel is in fluid connection with an annular opening of a second said chamber;
(i) axial air/gas supply means for delivering air/gas to said vessel through the air/gas end of said vessel;
(j) air/gas distribution means for supplying air/gas to said feedstock, wherein a plurality of air/gas distribution means are longitudinally disposed parallel to the axis of said vessel spaced to optimize the digestion of sewage, the improvement characterized in that:
A. said plurality of air/gas distribution means each comprising:
(1) pipe string substantially the length of said chamber, said pipe string supporting and supplying through fittings with diffusers to dispense air through holes so tiny that back-flow is limited, and only very tiny bubbles of air emerge;

(2) each said pipe string is fitted with hangers with heads to engage a slotted support rail welded to an assigned chamber and leading to a port in the end plate of said vessel at the input end of said digester;

(3) each said port being fitted with means to hold said pipe string input end in secure and fluid-tight connection to said end plate;

(4) the proximal end of each air/gas distributor pipe being connected to a hose which in turn connects intimately to an air header, said air header joining a group of other hoses from distribution pipes, each said air header fed from a distributor valve which rotates with said digester vessel and modulates said air/gas flow as the valve ports to the headers are modulated by a cylindrical gate which remains fixed as said valve rotates, said gate increasing the flow where needed, said gate reducing the air/gas flow when said distributor pipe rises above the fluid level in said digester;

(5) wherein outflowing gas, excessive air, carbon dioxide, and methane are released at the top of the output end of said digester, said output end at an opposite location from said input end.

11. An improved digester as described in claim 1, wherein a valve controls the level of liquid within the digester by modulating the pressure.

12. An improved digester as described in claim 2, wherein said digester supplies air/gas to said sewage through:

(a) a commutator valve;

(b) a plurality of hoses, each having a first end and a second end;

(c) a plurality of clamping devices with flanges;

(d) a first set of pipes;

(e) a second set of pipes, said pipes being air/gas distributor arms, said first set of pipes supplied with gas/air by said hoses, said first pipes coupled to said first ends of said hoses with said clamping devices, said second ends of said hoses coupled to said second set of pipes, said second set of pipes physically connected to said plenum, said sewage and air/gas entering and exiting said digester at opposite ends of said digester;

(f) a horizontal cylindrical shell;

(g) end members for said shell forming a liquid-tight seal with said shell;

(h) means adapted to rotate said shell about its axis;

(i) a plurality of truncated cones mounted within the input end of said shell, concentric thereto, whereby there are defined a central axial channel and a plurality of annular channels radiating from said axial channel at an end thereof;

(j) said truncated cones adapted to be rotated with said shell;

(k) end members for each of said truncated cones;

(l) axial feed means adapted to introduce feed into one end of said axial channel, wherein the other end of said channel is in fluid connection with an annular opening of a second axial channel within a second truncated cone;

(m) axial gas air/gas supply means for delivering air/gas to said shell;

(n) air/gas distribution means for supplying said air/gas to said feedstock, wherein a plurality of air/gas distribution means are longitudinally disposed parallel to the axis of said shell along different radii within said shell, the improvement characterized by:

a triclamp device or other mechanical means to hold said air/gas distribution means in place for the purpose of aerating the feedstock, said device or other mechanical means capable of allowing the manual removal of air/gas distribution means to be cleaned or inspected according to environmental code requirements.

13. An improved horizontal rotary, continuous-feed digester which comprises:

(a) a horizontal cylindrical shell;

(b) end members for said shell forming a liquid-tight seal with said shell;

(c) rotating means adapted to rotate said shell about its axis;

(d) a plurality of reaction cylinders mounted within said shell, concentric thereto, whereby there are defined a central axial channel, and a plurality of annular channels, radiating from said axial channel at an end thereof;

(e) said reaction cylinders adapted to be rotated with said shell;

(f) end members for each of said reaction cylinders;

(g) axial feed means adapted to introduce feed into one end of said axial channel;

(h) wherein the other end of said channel is in fluid connection with an annular opening of a second axial channel within a second reaction cylinder;

(i) axial gas supply means for delivering air/gas to said shell;

(j) air/gas distribution means for supplying air/gas to said feedstock, wherein a plurality of air/gas distribution means are longitudinally disposed parallel to the axis of said shell along different radii within said shell, said air/gas distribution means characterized in that one of said end members of each said distribution means comprises a digester for digesting raw sewage with aerobic bacteria, said digester having a first horizontal end and a second opposite horizontal end, said digester also comprising a first and a second end plate, said digester further comprising a first end piece and a second end piece, said digester producing effluent, said digester further comprising:

(A) a main horizontal cylindrical shell;

(B) a first secondary reaction cylinder coaxial with said shell; a second secondary cylinder member coaxial with said shell, each with a first and second end, said main cylinder member in fluid communication with said secondary cylinder members, said digester containing an entrance and exit means for air/gas, sewage and effluent, the improvements comprising:

(a) air/gas distribution means by which air/gas enters from said first end of said digester and exhaust gases exit from said second opposite end;

(i) said means comprising apparatus which can be removed from said digester to be cleaned and subsequently replaced within said digester;

(ii) said means being the same in number for each cylinder;

(iii) said means permitting a controlled flow of air/gas to said sewage at a predetermined controllable rate;

(b) means by which said raw sewage enters said first end of said digester, with said effluent expelled at said opposite second horizontal end; and (c) a flexible hose covered with a mesh, said hose further connected to a header pipe, said header pipe in turn intimately connected to an air plenum.

14. A digester as in claim 5, wherein said air/gas distribution means further comprise ceramic diffusers.

15. An improved digester as described in claim 6, wherein said entire air distribution system comprises:
    (a) a first set of arms;
    (b) a plurality of hoses, each with a first end and a second end;
    (c) a plurality of clamping devices with flanges;
    (d) a second set of arms;
    (e) a commutator valve for said air/gas;
    (f) said first set of arms supplied with air/gas by said hoses, said first arms coupled to said first ends of said hoses with said clamping devices, said second ends of said hoses coupled to said second set of arms, said second set of arms physically connected to said plenum.

16. An improved digester as described in claim 7, wherein said clamping means is a heavy duty clamped flanged fitting.

17. An improved digester as described in claim 7, wherein said aerated sewage moves through said digester at the rate of not less than approximately two feet per second.

18. A improved digester as described in claim 7, wherein said sewage and air/gas exit and enter at opposite ends of the digester.

19. An improved horizontal, rotating, continuous-feed digester comprising:
    (a) a horizontal cylindrical shell;
    (b) end members for said shell forming a liquid-tight seal with said shell;
    (c) rotating means adapted to rotate said shell about its axis;
    (d) a plurality of reaction cylinders mounted within said shell, concentric thereto, whereby there are defined a central axial channel and a plurality of annular channels radiating from said axial channel;
    (e) said reaction cylinders adapted to be rotated with said shell;
    (f) end members for each of said reaction cylinders;
    (g) axial feed means adapted to introduced feed into one end of said axial channel;
    (h) wherein the other end of said channel is in fluid connection with an annular opening of a second axial channel within a second reaction cylinder;
    (i) axial air/gas supply means for delivering air/gas to said shell;
    (j) air/gas distribution means for supplying air/gas to said feedstock;
    (k) wherein a plurality of air/gas distribution means are longitudinally disposed parallel to the axis of said shell along different radii within said shell, characterized in that one of said end members and each of said distribution means comprises a digester for digesting raw sewage with aerobic bacteria, said digester having a first horizontal end and a second opposite horizontal end, said digester also comprising a first end plate and a second end plate, said digester further comprising a first end piece and a second end piece, said digester producing effluent, said digester further comprising:
    (A) a main horizontal cylindrical shell;
    (B) a first secondary reaction cylinder coaxial with said shell and a second secondary reaction cylinder coaxial with said shell, each with a first and second end, said main cylinder member in fluid communication with said secondary cylinder members, said digester containing an entrance and exit means for air/gas, sewage, and effluent, the improvements comprising:
        said first end of said digester and exhaust gases exiting from said second opposite end,
            (i) said distribution means comprising an apparatus which can be removed from said digester to be cleaned and subsequently replaced within said digester;
            (ii) said distribution means being the same in number for each cylinder;
            (iii) said means permitting a controlled flow of air/gas to said sewage at a predetermined controllable rate;
                (b) means by which said raw sewage enters said first end of said digester, with said effluent expelled at said opposite second horizontal end.

20. A digester as described in claim 1, wherein said exhaust air/gas departs from said digester through a non-rotatable axial pipe.

21. A digester as described in claim 1, wherein said air/gas distribution pipes further comprise means for coupling with slotted raceways the interior surface of said cylinder member, said raceways providing support and guidance for removal and replacement of said pipes within said digester.

22. An improved horizontally rotatable, continuous-feed digester comprising:
    (a) a horizontal cylindrical shell;
    (b) end members for said shell forming a liquid-tight seal with said shell;
    (c) a motor;
    (d) transmission means to connect said motor to rotate said shell about its axis;
    (e) a plurality of reaction cylinders mounted within said shell, concentric thereto, whereby there are defined a central axial channel and a plurality of annular channels radiating from said axial channel;
    (f) said reaction cylinders adapted to be rotated with said shell;
    (g) end members for each of said reaction cylinders;
    (h) axial feed means adapted to introduced feedstock into one end of said axial channel;
    (i) wherein the other end of said channel is in fluid connection with an annular opening of a second axial channel within a second reaction cylinder;
    (i) axial air/gas supply means for delivering air/gas to said shell;
    (j) air/gas distribution means for supplying air/gas to said feedstock;
    (k) wherein a plurality of air/gas distribution means are longitudinally disposed parallel to the axis of said shell along different radii within said shell, characterized in that one of aid end members and each of said distribution means comprises a digester for digesting raw sewage with aerobic bacteria, said digester having a first horizontal end and a second opposite horizontal end, said digester also comprising a first end plate and a second end plate, said digester further comprising a first end piece and a second end piece, said digester producing effluent, said digester further comprising:
    (A) a main horizontal cylindrical shell;
    (B) a first secondary reaction cylinder coaxial with said shell and a second secondary reaction cylinder coaxial with said shell, each with a first and second end, said main cylinder member in fluid communication with said secondary cylinder members, said digester containing an entrance and exit means for air/gas, sewage, and effluent, the improvements comprising:

(a) air/gas distribution means by which fresh air/gas enters said first end of said digester and exhaust air/gas exits from said second opposite end;
  (i) said distribution means comprising an apparatus which can be removed from said digester to be cleaned and subsequently replaced within said digester;
  (ii) said distribution means being the same in number for each cylinder member;
  (iii) said distribution means permitting a controlled flow of air/gas to said sewage at a predetermined controllable rate;
(b) means by which said raw sewage enters said first end of said digester, with said effluent expelled at said opposite second horizontal end.

* * * * *